United States Patent
Wu

(10) Patent No.: US 10,334,494 B2
(45) Date of Patent: Jun. 25, 2019

(54) DEVICE AND METHOD OF HANDLING DATA TRANSMISSIONS AFTER A HANDOVER

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/826,722

(22) Filed: Nov. 30, 2017

(65) Prior Publication Data

US 2018/0160348 A1    Jun. 7, 2018

Related U.S. Application Data

(60) Provisional application No. 62/429,086, filed on Dec. 2, 2016.

(51) Int. Cl.
*H04W 36/08* (2009.01)
*H04W 76/27* (2018.01)
(Continued)

(52) U.S. Cl.
CPC ....... *H04W 36/08* (2013.01); *H04W 36/0044* (2013.01); *H04W 36/0055* (2013.01);
(Continued)

(58) Field of Classification Search
CPC . H04W 36/08; H04W 76/27; H04W 36/0016; H04W 36/0055
See application file for complete search history.

(56) References Cited

U.S. PATENT DOCUMENTS

2005/0113093 A1* 5/2005 Mohebbi ................. H04Q 7/20
2006/0077928 A1* 4/2006 Amano ................. H04Q 7/00
(Continued)

FOREIGN PATENT DOCUMENTS

JP      2010-506470 A    2/2010
WO     2011/118196 A1    9/2011
WO     2015/114687 A1    8/2015

OTHER PUBLICATIONS

3GPP TR 23.799 V1.1.0 (Oct. 2016) Technical Report 3rd Generation Partnership Project; Technical Specification Group Services and System Aspects; Study on Architecture for Next Generation System (Release 14).
(Continued)

*Primary Examiner* — Ronald B Abelson
(74) *Attorney, Agent, or Firm* — Winston Hsu

(57) ABSTRACT

A communication device for handling data transmissions after a handover comprises a storage device for storing instructions comprising receiving a first radio resource control (RRC) message configuring a first data radio bearer (DRB) and configuring a mapping that a first flow is mapped to the first DRB, from a first base station (BS); receiving a first PDU of the first flow or a second flow over a second DRB from the first BS; transmitting a second plurality of PDUs of the first flow over the second DRB in response to the first PDU; receiving a handover command from the first BS; performing a handover to a second BS in response to the handover command; and transmitting a third plurality of PDUs of the first flow over the first DRB to the second BS in response to the handover command, after performing the handover to the second BS.

20 Claims, 8 Drawing Sheets

(51) Int. Cl.
*H04W 36/00* (2009.01)
*H04W 36/04* (2009.01)
*H04W 72/12* (2009.01)
*H04W 28/02* (2009.01)
*H04W 76/20* (2018.01)

(52) U.S. Cl.
CPC ........ *H04W 76/27* (2018.02); *H04W 28/0263* (2013.01); *H04W 36/0027* (2013.01); *H04W 36/04* (2013.01); *H04W 72/1263* (2013.01); *H04W 76/20* (2018.02)

(56) References Cited

U.S. PATENT DOCUMENTS

2009/0252132 A1* 10/2009 Song ................. H04W 4/00
2010/0240385 A1   9/2010 Löhr
2014/0044097 A1   2/2014 Chen

OTHER PUBLICATIONS

Office Action dated Jan. 8, 2019 for the Japanese Application No. 2017-231688, filed Dec. 1, 2017, pp. 1-3.

* cited by examiner

DEVICE AND METHOD OF HANDLING DATA TRANSMISSIONS AFTER A HANDOVER

CROSS REFERENCE TO RELATED APPLICATIONS

This application claims the benefit of U.S. Provisional Application No. 62/429,086 filed on Dec. 2, 2016, which is incorporated herein by reference.

BACKGROUND OF THE INVENTION

1. Field of the Invention

The present invention relates to a device and a method used in a wireless communication system, and more particularly, to a device and a method of handling data transmissions after a handover.

2. Description of the Prior Art

A long-term evolution (LTE) system includes a carrier aggregation (CA), a Dual Connectivity (DC), a LTE transmission over an unlicensed spectrum (e.g., LTE-unlicensed (LTE-U) or licensed-assisted access (LAA)).

SUMMARY OF THE INVENTION

The present invention therefore provides a communication device and method for handling data transmissions after a handover to solve the abovementioned problem.

A communication device for handling data transmissions after a handover comprises a storage device for storing instructions and a processing circuit coupled to the storage device. The processing circuit is configured to execute the instructions stored in the storage device. The instructions comprise receiving a first radio resource control (RRC) message configuring a first data radio bearer (DRB) and configuring a mapping that a first flow is mapped to the first DRB, from a first base station (BS); transmitting a first plurality of Protocol Data Units (PDUs) of the first flow over the first DRB in response to the first RRC message; receiving a second PDU of the first flow or a second flow over a second DRB from the first BS; transmitting a third plurality of PDUs of the first flow over the second DRB in response to the second PDU; receiving a handover command from the first BS; performing a handover to a second BS in response to the handover command; and transmitting a fourth plurality of PDUs of the first flow over the first DRB to the second BS in response to the handover command, after performing the handover to the second BS.

A communication device for handling data transmissions after a handover comprises a storage device for storing instructions and a processing circuit coupled to the storage device. The processing circuit is configured to execute the instructions stored in the storage device. The instructions comprise receiving a first radio resource control (RRC) message configuring a first data radio bearer (DRB) and configuring a mapping that a first flow is mapped to the first DRB, from a first base station (BS); transmitting a first plurality of Protocol Data Units (PDUs) of the first flow over the first DRB in response to the first RRC message; receiving a second PDU of the first flow or a second flow over a second DRB from the first BS; transmitting a third plurality of PDUs of the first flow over the second DRB in response to the second PDU; receiving a handover command from the first BS; performing a handover to a second BS in response to the handover command; and transmitting a fourth plurality of PDUs of the first flow over the second DRB to the second BS in response to the handover command, after performing the handover to the second BS.

A network comprising a first base station (BS) and a second BS for handling data transmissions, configured to perform the instructions of the first BS transmitting a first radio resource control (RRC) message configuring a first data radio bearer (DRB) and configuring a mapping that a first flow is mapped to the first DRB, to a communication device; the first BS communicating a first Protocol Data Unit (PDU) of the first flow over the first DRB with the communication device in response to the first RRC message; the first BS determining to transmit a second plurality of PDUs of the first flow or a second flow over a second DRB to the communication device; the first BS communicating a third plurality of PDUs of the first flow over the second DRB with the communication device in response to the determination; the first BS transmitting a handover command to the communication device to hand over the communication device to the second BS; and the second BS communicating a fourth plurality of PDUs of the first flow over the first DRB with the communication device according to the mapping, after the communication device hands over to the second BS.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
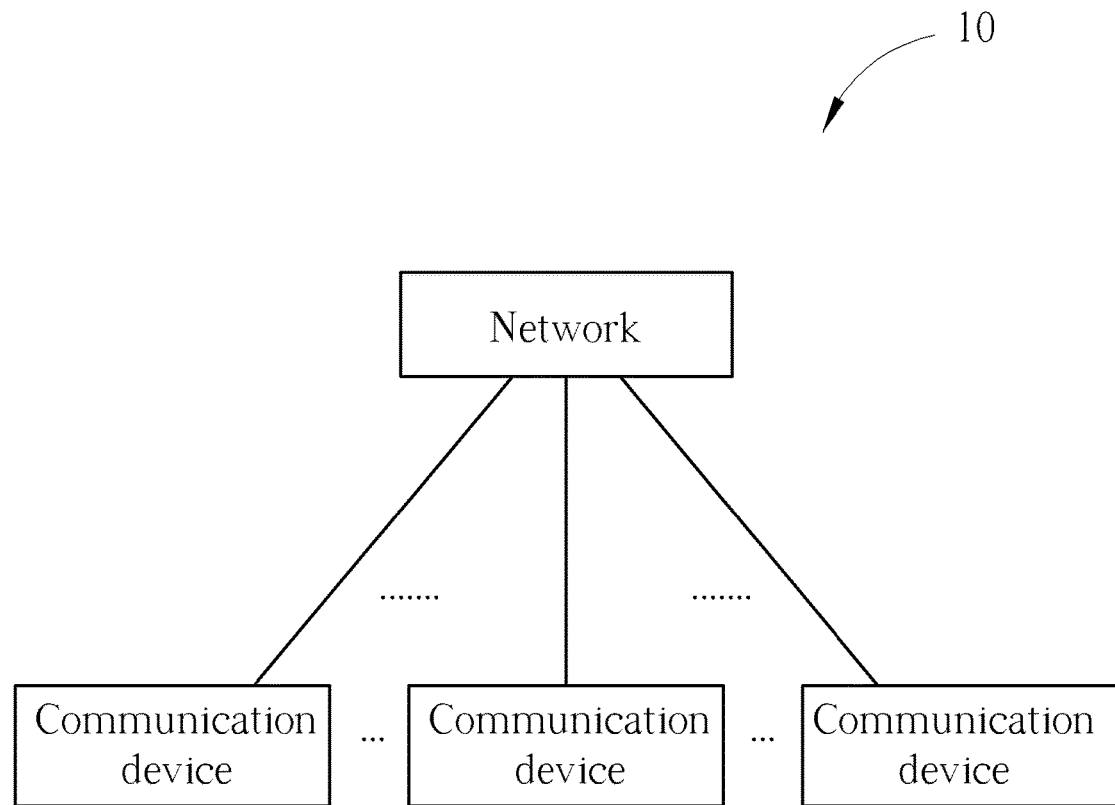
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s). The network and the communication device may simultaneously communicate with each other via one or multiple cells (e.g., multiple carriers) belonging to one or multiple base stations (BSs). The abovementioned cells may be operated in the same or different duplexing modes, e.g., frequency-division duplexing (FDD), time-division duplexing (TDD) or flexible duplexing.

In FIG. 1, the network and the communication devices are simply utilized for illustrating the structure of the wireless communication system 10. Practically, the network may be an evolved UTRAN (E-UTRAN) including at least one evolved Node-B (eNB) in a LTE-A system or an evolution of the LTE-A system, or a 5G radio access network including a 5G base station (e.g., gNB). The 5G radio communication technology may employ orthogonal frequency-division multiplexing (OFDM) and/or non-OFDM and shorter than 1 ms (e.g., 100 or 200 us), and may support a wider system bandwidth for communications between the communication devices and the BS.

A communication device may be a user equipment (UE), a mobile phone, a laptop, a tablet computer, an electronic book, a portable computer system, a vehicle, a ship or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
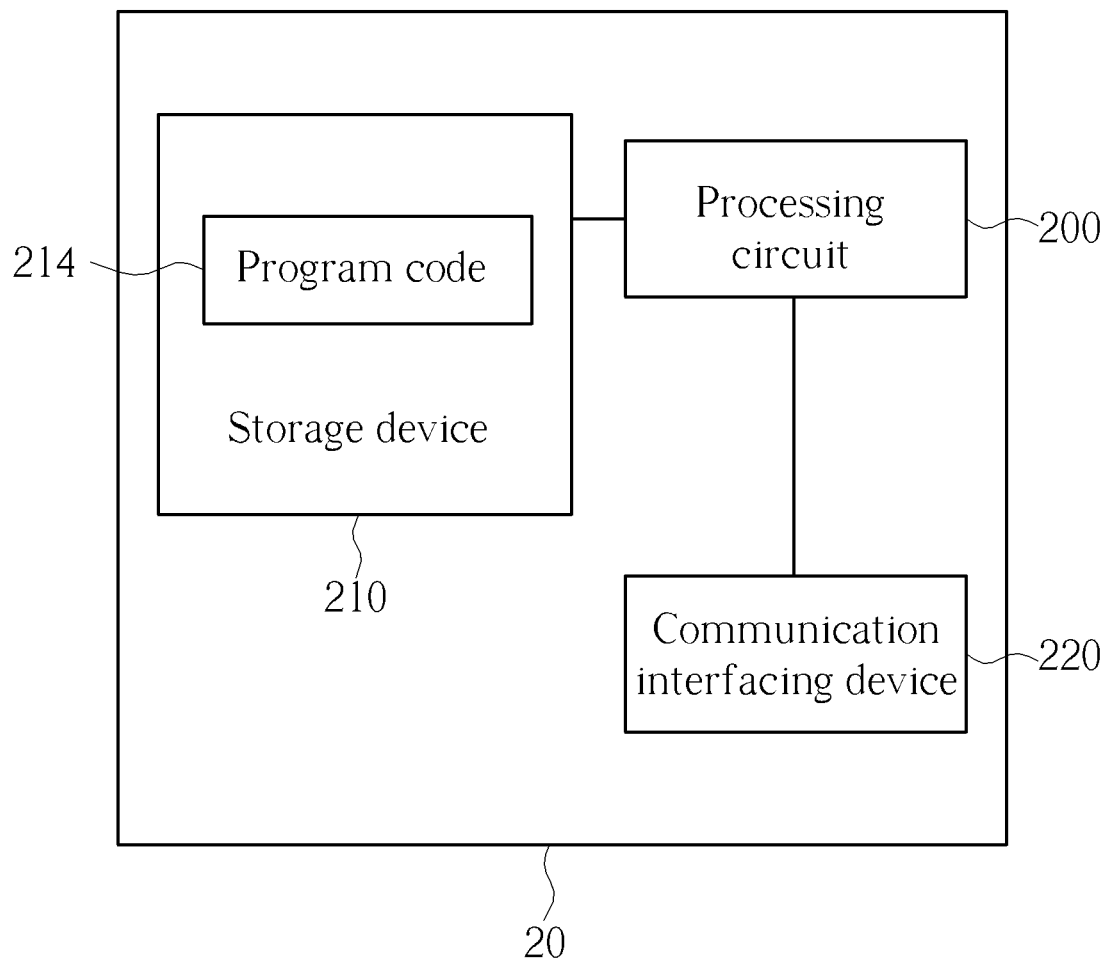
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit (ASIC), a storage device 210, a communication interfacing device 220 and a communication interfacing device 240. The storage device 210 may be any data storage device that may store a program code 214, accessed and executed by the processing circuit 200. Examples of the storage device 210 include but are not limited to a subscriber identity module (SIM), read-only memory (ROM), flash memory, random-access memory (RAM), hard disk, optical data storage device, non-volatile storage unit, non-transitory computer-readable medium (e.g., tangible media), etc. The communication interfacing devices 220 and 240 are preferably are transceivers used to transmit and receive signals (e.g., data, messages and/or packets) according to processing results of the processing circuit 200.

In the following examples, a UE is used to represent a communication device in FIG. 1, to simplify the illustration of the embodiments.

Figure 3:
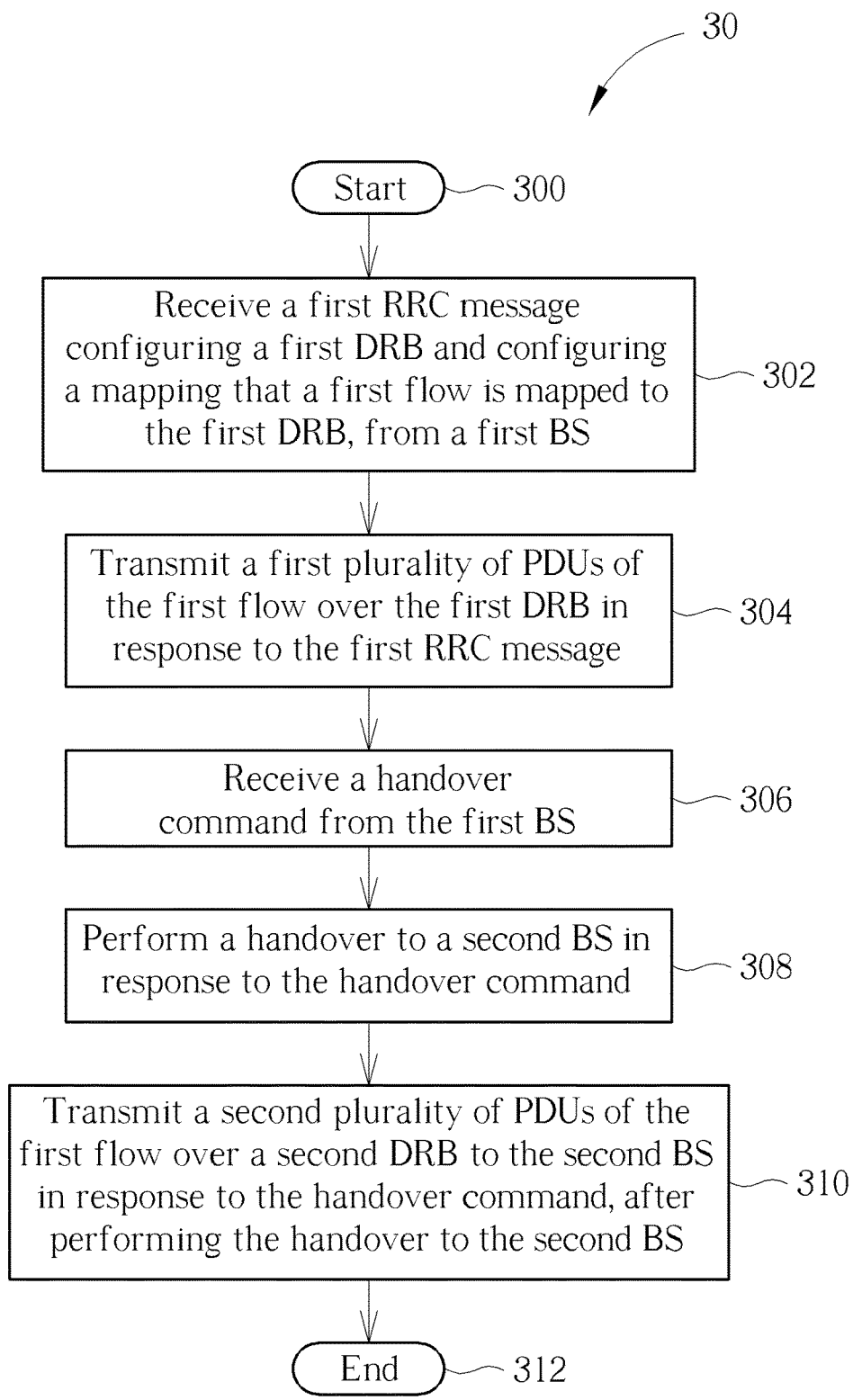
FIG. 3 is a flowchart of a process according to an example of the present invention.

FIG. 3 is a flowchart of a process 30 according to an example of the present invention. The process 30 may be utilized in a UE, to transmit data. The process 30 includes the following steps:

Step 300: Start.

Step 302: Receive a first Radio Resource Control (RRC) message configuring a first Data Radio Bearer (DRB) and configuring a mapping that a first flow is mapped to the first DRB, from a first BS.

Step 304: Transmit a first plurality of Protocol Data Units (PDUs) of the first flow over the first DRB in response to the first RRC message.

Step 306: Receive a handover command from the first BS.

Step 308: Perform a handover to a second BS in response to the handover command.

Step 310: Transmit a second plurality of PDUs of the first flow over a second DRB to the second BS in response to the handover command, after performing the handover to the second BS.

Step 312: End.

In one example, the first RRC message includes a mapping configuration configuring the mapping and a DRB configuration configuring the first DRB. The UE transmits the first plurality of PDUs of the first flow over the first DRB in response to the mapping configuration.

In one example, the second DRB is a default DRB. The first RRC message may configure the default DRB. Alternatively, the first BS may transmit a second RRC message configuring the default DRB before transmitting the first RRC message. The UE may transmit the second plurality of PDUs of the first flow over the second DRB to the second BS, when the handover command does not configure the mapping that the first flow is mapped to the first DRB. That is, the UE releases the mapping configuration and uses the default DRB to transmit the second plurality of PDUs of the first flow, in response to the handover command.

In one example, the UE keeps the DRB configuration in response to the handover command. If the mapping configuration is included in the DRB configuration, the UE may release the mapping configuration but keep at least one configuration (e.g., DRB identity, radio link control (RLC) configuration, etc.) in the DRB configuration. If the mapping configuration is included in a Packet Data Convergence Protocol (PDCP) configuration, the UE may release the mapping configuration but keep at least one configuration in the PDCP configuration.

In one example, the UE is configured with an identifier (e.g., Radio Network Temporary Identifier (RNTI)) for monitoring a control channel transmitted by the network to schedule UL transmission(s) and/or DL transmission(s), before performing the handover. The UE may keep the identifier in response to the handover command, if the handover command does not include a new identifier.

In one example, the UE may release transmit a power control configuration and/or a periodic channel quality indication (CQI) reporting configuration in response to the handover command.

In one example, the UE transmits the second plurality of PDUs over a third DRB to the second BS, when the handover command configures a mapping configuration indicating a mapping that the first flow is mapped to the third DRB.

Figure 4:
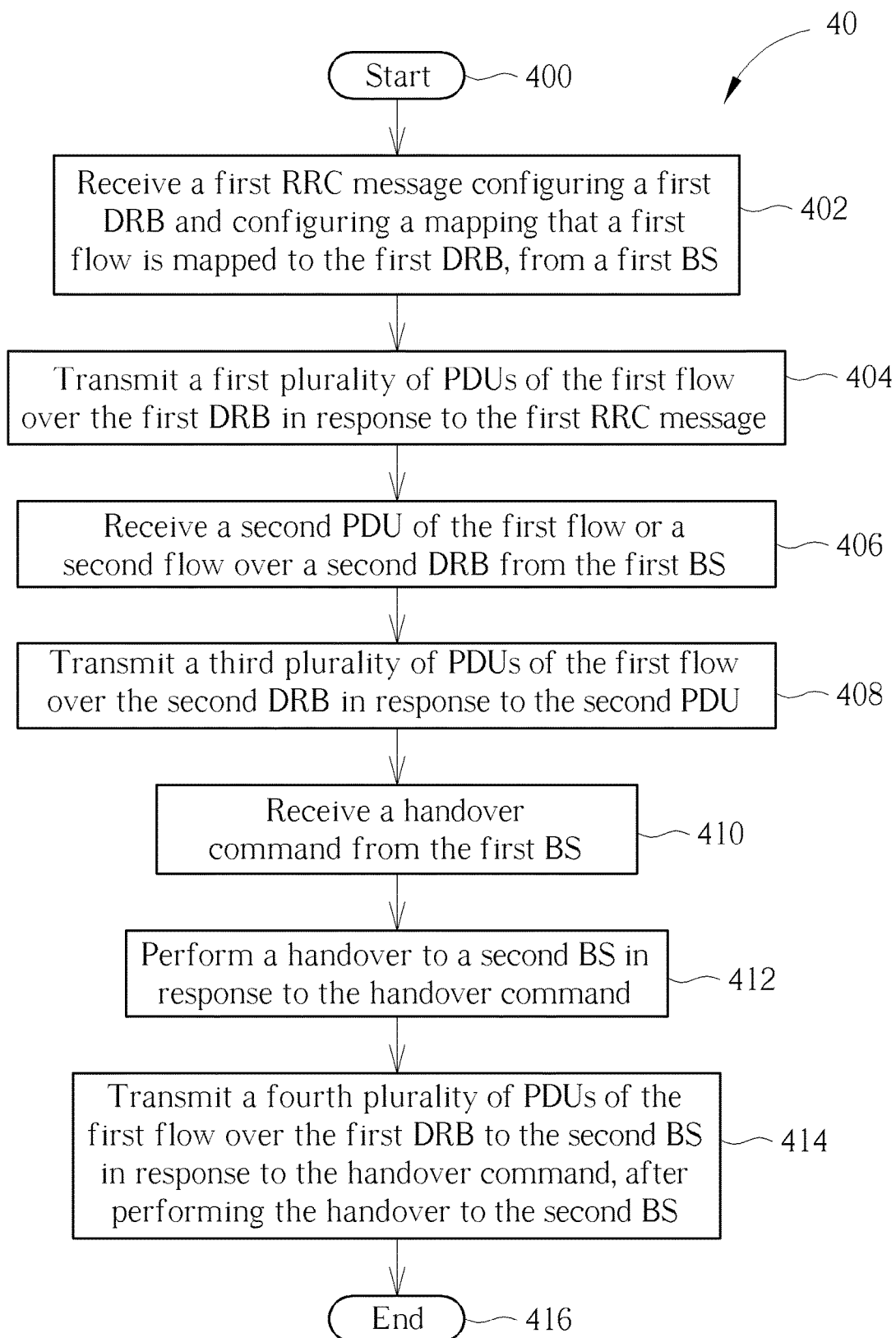
FIG. 4 is a flowchart of a process according to an example of the present invention.

FIG. 4 is a flowchart of a process 40 according to an example of the present invention. The process 40 may be utilized in a UE, to transmit data. The process 40 includes the following steps:

Step 400: Start.

Step 402: Receive a first RRC message configuring a first DRB and configuring a mapping that a first flow is mapped to the first DRB, from a first BS.

Step 404: Transmit a first plurality of PDUs of the first flow over the first DRB in response to the first RRC message.

Step 406: Receive a second PDU of the first flow or a second flow over a second DRB from the first BS.

Step 408: Transmit a third plurality of PDUs of the first flow over the second DRB in response to the second PDU.

Step 410: Receive a handover command from the first BS.

Step 412: Perform a handover to a second BS in response to the handover command.

Step 414: Transmit a fourth plurality of PDUs of the first flow over the first DRB to the second BS in response to the handover command, after performing the handover to the second BS.

Step 416: End.

In one example, the first RRC message includes a mapping configuration configuring the mapping and a DRB configuration configuring the first DRB. The UE transmits the first plurality of PDUs of the first flow over the first DRB in response to the mapping configuration. In one example, the first RRC message configures the second DRB. In one example, the UE receives a second RRC message configuring the second DRB.

In one example, the first BS transmits the second PDU of the first flow or the second flow over the second DRB to the UE in order to indicate the UE to use the second DRB to transmit PDUs of the first flow and the second flow (if configured). After performing the handover, the UE determines the indication is not valid since the second BS may not be aware of the indication. Thus, the UE applies the mapping configuration to transmit the PDUs over the first DRB. In one example, the first flow and the second flow may be configured by the first BS to be aggregated on the first DRB in the first RRC message or the second RRC message.

In one example, the UE may keep the mapping configuration and the DRB configuration in response to the handover command. The mapping configuration may or may not be included in the DRB configuration. The UE may release a Secondary Cell (SCell) configuration or a Secondary Cell Group (SCG) configuration in response to the handover command.

In one example, the UE transmits the fourth plurality of PDUs of the first flow over the first DRB to the second BS in response to the handover command, when the handover command does not include a mapping configuration indicating the first flow to a DRB. That is, the UE does not change the mapping after performing the handover, when the handover command does not include the mapping configuration. In addition, when the handover command may not configure the mapping, the UE may know that the network prefers the UE to keep the mapping that the first flow is mapped to the first DRB. The UE may transmit a fifth plurality of PDUs of the first flow over the second DRB to the second BS after performing the handover in response to the handover command, when the handover command includes a mapping configuration configuring a mapping that the first flow is mapped to the second DRB. Examples for the process 30 may be applied to the process 40, and are not narrated herein.

Figure 5:
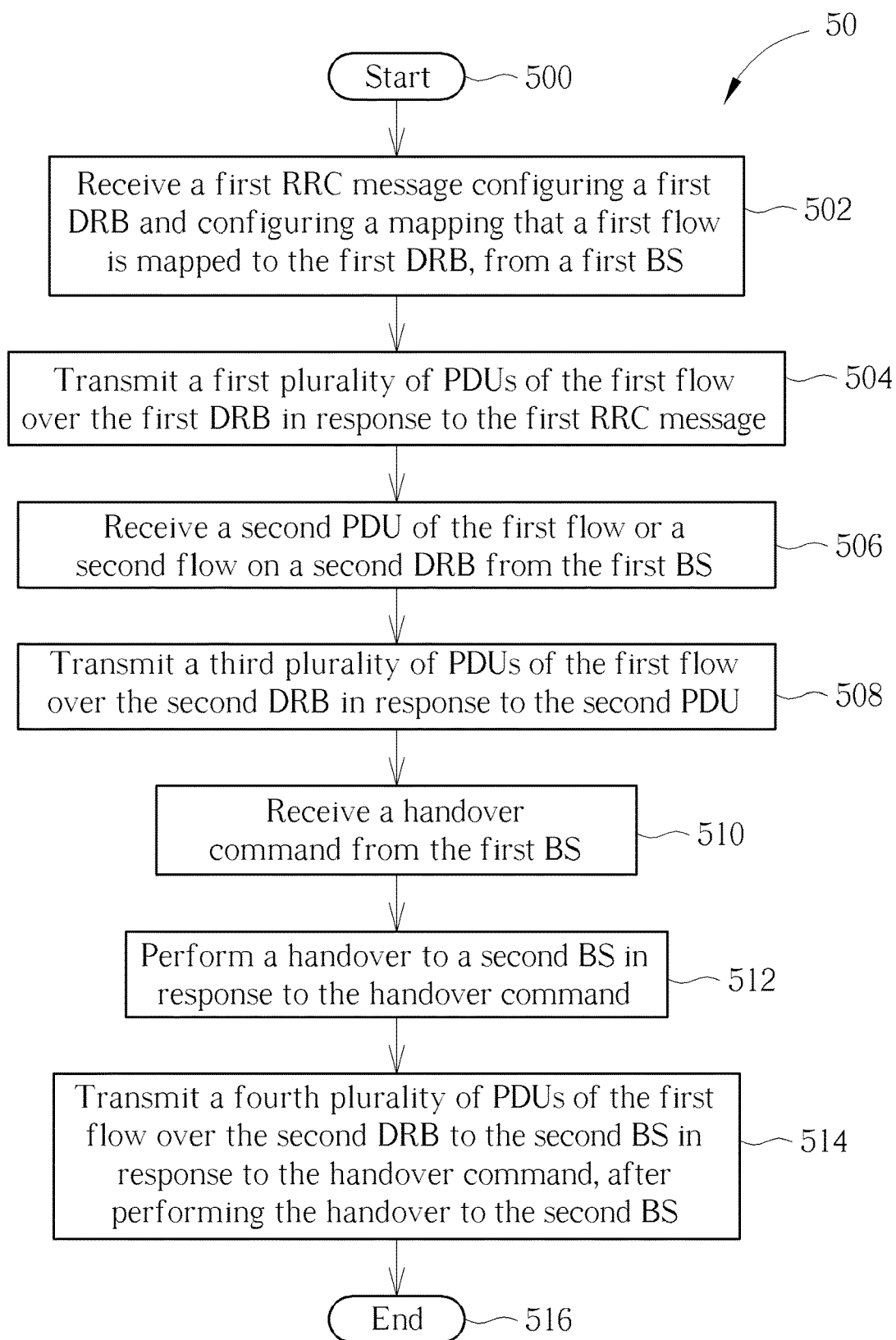
FIG. 5 is a flowchart of a process according to an example of the present invention.

FIG. 5 is a flowchart of a process 50 according to an example of the present invention. The process 50 may be utilized in a UE, to transmit data. The process 50 includes the following steps:

Step 500: Start.

Step 502: Receive a first RRC message configuring a first DRB and configuring a mapping that a first flow is mapped to the first DRB, from a first BS.

Step 504: Transmit a first plurality of PDUs of the first flow over the first DRB in response to the first RRC message.

Step 506: Receive a second PDU of the first flow or a second flow over a second DRB from the first BS.

Step 508: Transmit a third plurality of PDUs of the first flow over the second DRB in response to the second PDU.

Step 510: Receive a handover command from the first BS.

Step 512: Perform a handover to a second BS in response to the handover command.

Step 514: Transmit a fourth plurality of PDUs of the first flow over the second DRB to the second BS in response to the handover command, after performing the handover to the second BS.

Step 516: End.

In one example, the first RRC message includes the mapping configuration configuring the mapping and the DRB configuration configuring the first DRB. In one example, the first RRC message configures the second DRB. In one example, the UE receives a second RRC message configuring the second DRB.

In one example, the first BS transmits the second PDU of the first flow or the second flow over the second DRB to the UE in order to indicate the UE to use the second DRB to transmit PDUs of the first flow and the second flow (if configured). After performing the handover, the UE determines that the indication is still valid since the second BS may receive the indication from the first BS. In one example, the second BS receives an updated mapping configuration updated by the first BS from the first BS, wherein the updated mapping configuration configures the first flow being mapped to the second DRB. The UE may update the mapping configuration to the updated mapping configuration according to the indication. Thus, the UE applies the indication or the updated mapping configuration to transmit the PDUs of the first flow over the second DRB to the second BS, after performing the handover. In one example, the first flow and the second flow are configured by the first BS to be aggregated on the same DRB in the first RRC message or the second RRC message.

In one example, the UE keeps the mapping configuration and the DRB configuration in response to the handover command. The mapping configuration may or may not be included in the DRB configuration. The UE may release a SCell configuration or a SCG configuration in response to the handover command.

In one example, the UE transmits the fourth plurality of PDUs of the first flow over the second DRB after performing the handover in response to the handover command, when the handover command does not include a mapping configuration indicating that the first flow is mapped to a DRB. That is, the UE does not change the mapping of the first flow to the second DRB after performing the handover, when the handover command does not include the mapping configuration. In addition, when the handover command may not configure the mapping that the first flow is mapped to the second DRB, the UE may know that the network prefers the UE to keep the mapping. The UE may transmit a fifth plurality of PDUs of the first flow over a third DRB in response to the handover command, when the handover command includes a mapping configuration configuring a mapping that the first flow is mapped to the third DRB. Examples for the process 30 and 40 may be applied to the process 50, and are not repeated herein.

In one example, the first DRB, the second DRB and the third DRB have different quality of services (QoSs).

Figure 6:
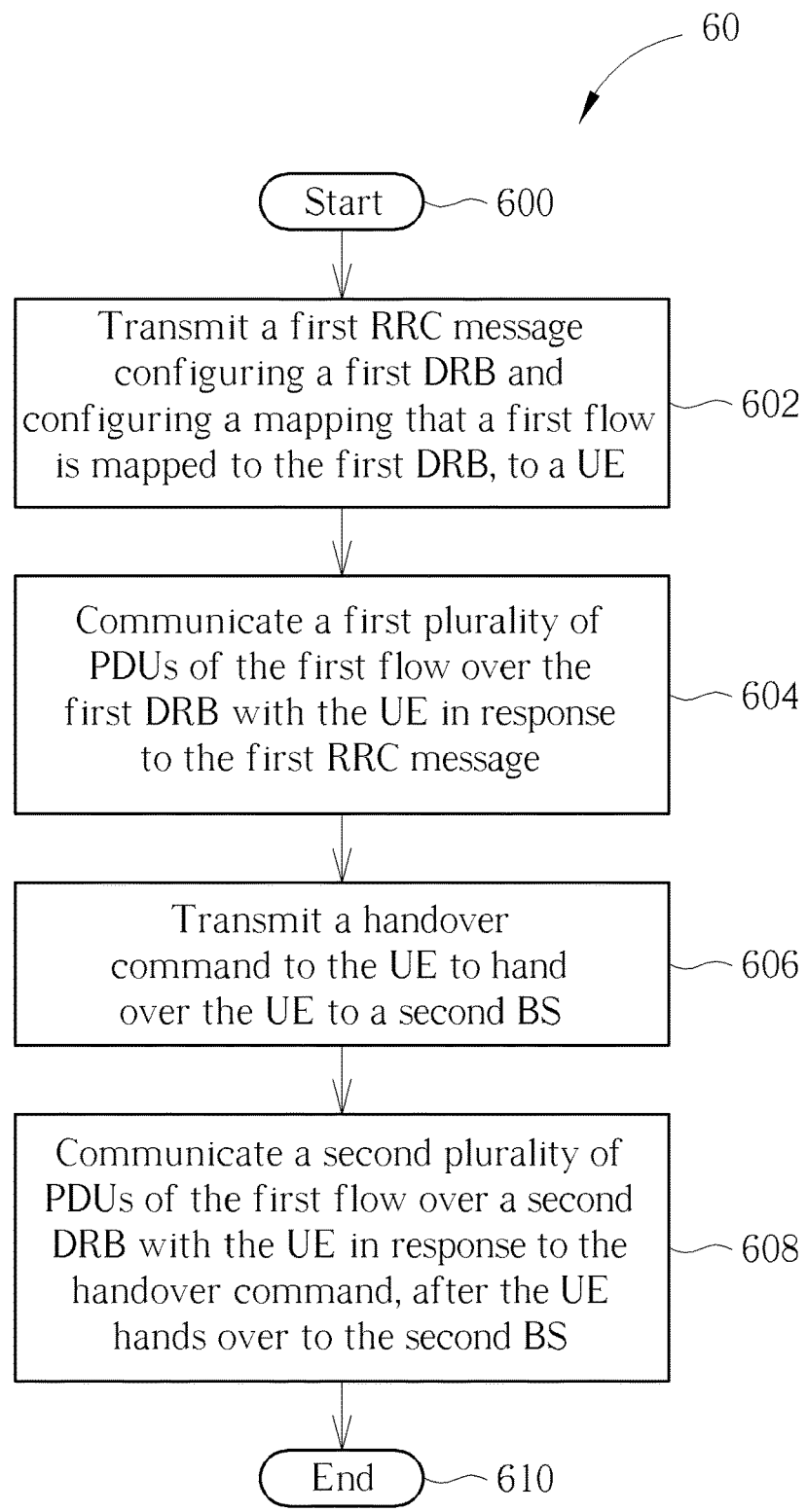
FIG. 6 is a flowchart of a process according to an example of the present invention.

FIG. 6 is a flowchart of a process 60 according to an example of the present invention. The process 60 may be utilized in the network in FIG. 1 which includes at least one of a first BS and a second BS, to configure a QoS to a UE. The process 60 includes the following steps:

Step 600: Start.

Step 602: Transmit a first RRC message configuring a first DRB and configuring a mapping that a first flow is mapped to the first DRB, to a UE.

Step 604: Communicate a first plurality of PDUs of the first flow over the first DRB with the UE in response to the first RRC message.

Step 606: Transmit a handover command to the UE to hand over the UE to a second BS.

Step 608: Communicate a second plurality of PDUs of the first flow over a second DRB with the UE in response to the handover command, after the UE hands over to the second BS.

Step 610: End.

According to the process 60, the network (e.g., the first BS) transmits a first RRC message configuring a first DRB and configuring a mapping that a first flow is mapped to the first DRB, to a UE. The network (e.g., the first BS) communicates (e.g., transmits or receives) a first plurality of PDUs of the first flow over the first DRB with (to or from) the UE in response to the first RRC message. Then, the network (e.g., the first BS) transmits a handover command to the UE to hand over the UE to a second BS (e.g., after a while). The network (e.g., the second BS) communicates a second plurality of PDUs of the first flow over a second DRB with the UE in response to the handover command, after the UE hands over to the second BS.

In one example, in a handover preparation, the first BS does or does not transmit the mapping configuration to the second BS in a handover request message. The second BS may transmit a handover request acknowledge message to the first BS in response to the handover request message. The handover request acknowledge message may include the handover command. The second BS may determine a mapping configuration configuring a mapping that the first flow is mapped to the second DRB and include the mapping configuration in the handover command. When the first BS receives the handover request acknowledge message, the first BS transmits the handover command to the UE. In one example, the second BS may determine the mapping according to a QoS profile/configuration of the first flow. The second BS may receive the QoS profile/configuration from the first BS or a core network In one example, in a handover preparation, the first BS does not transmit the mapping configuration in a handover request message to the second BS. The second BS may transmit a handover request acknowledge message to the first BS in response to the handover request message. The handover request acknowledge message may include the handover command. The second BS does not include a mapping configuration in the handover command. When the first BS receives the handover request acknowledge message, the first BS transmits the handover command to the UE.

The process 60 may correspond to the network in the process 30. Examples of the process 30 may be applied to the process 60, and are not repeated herein.

Figure 7:
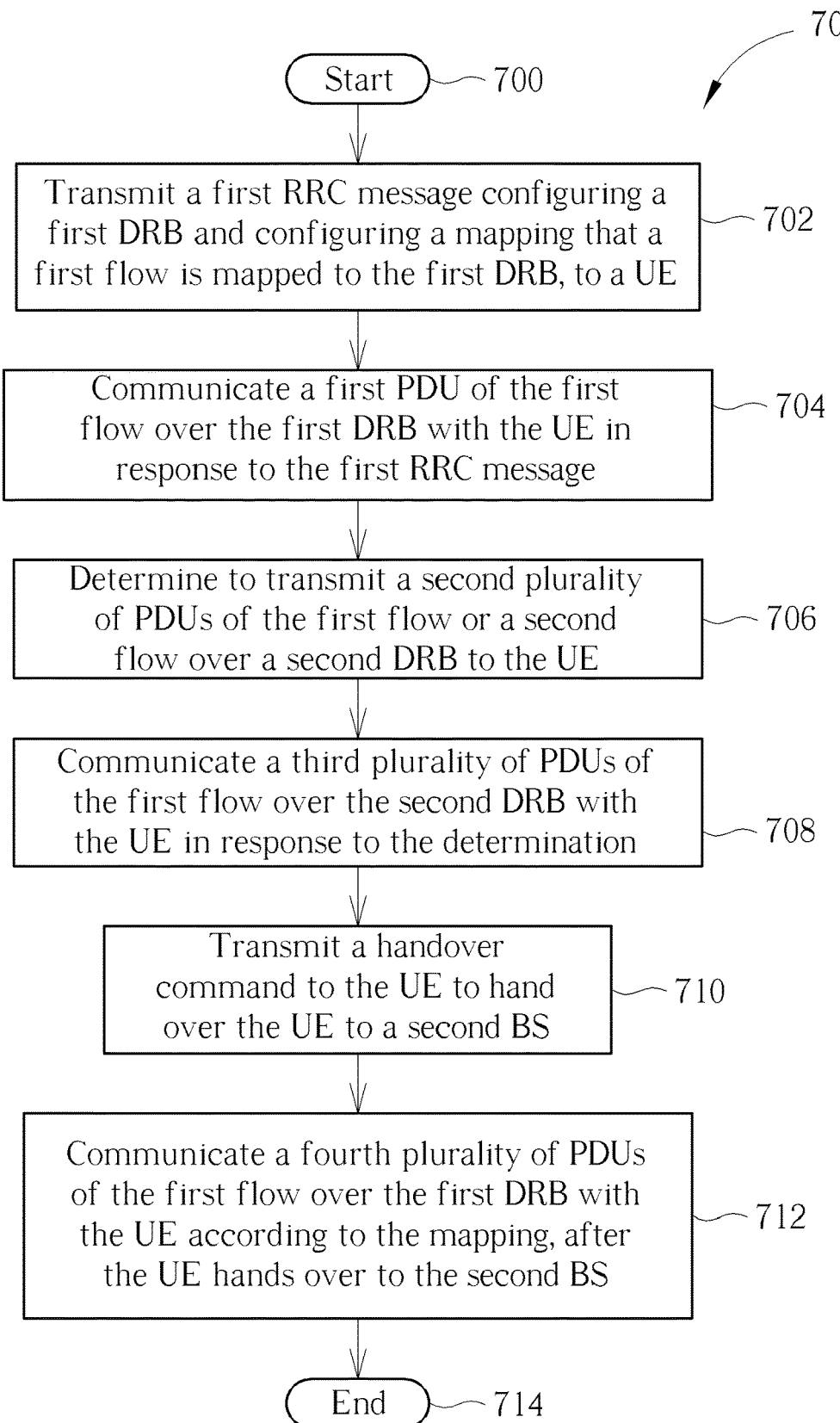
FIG. 7 is a flowchart of a process according to an example of the present invention.

FIG. 7 is a flowchart of a process 70 according to an example of the present invention. The process 70 may be utilized in the network in FIG. 1 which includes at least one of a first BS and a second BS, to configure a QoS to a UE. The process 70 includes the following steps:

Step 700: Start.

Step 702: Transmit a first RRC message configuring a first DRB and configuring a mapping that a first flow is mapped to the first DRB, to a UE.

Step 704: Communicate a first PDU of the first flow over the first DRB with the UE in response to the first RRC message.

Step 706: Determine to transmit a second plurality of PDUs of the first flow or a second flow over a second DRB to the UE.

Step 708: Communicate a third plurality of PDUs of the first flow over the second DRB with the UE in response to the determination.

Step 710: Transmit a handover command to the UE to hand over the UE to a second BS.

Step 712: Communicate a fourth plurality of PDUs of the first flow over the first DRB with the UE according to the mapping, after the UE hands over to the second BS.

Step 714: End.

According to the process 70, the network (e.g., the first BS) transmits a first RRC message configuring a first DRB and configuring a mapping that a first flow is mapped to the first DRB, to a UE. The network (e.g., the first BS) communicates (e.g., transmits or receives) a first PDU of the first flow over the first DRB with (e.g., to or from) the UE in response to the first RRC message. The network (e.g., the first BS) determines to transmit a second plurality of PDUs of the first flow or a second flow over a second DRB from the first BS. The network (e.g., the first BS) communicates a third plurality of PDUs of the first flow over the second DRB with the UE in response to the determination. Then, the network (e.g., the first BS) transmits a handover command to the UE to hand over the UE to a second BS (e.g., after a while). The network (e.g., the second BS) communicates a fourth plurality of PDUs of the first flow over the first DRB with the UE according to the mapping, after the UE hands over to the second BS.

In one example, in a handover preparation, the first BS transmits the mapping (e.g., in a mapping configuration) in a handover request message to the second BS. The second BS may transmit a handover request acknowledge message to the first BS in response to the handover request message. The handover request acknowledge message may include the handover command. When the first BS receives the handover request acknowledge message, the first BS transmits the handover command to the UE. The second BS may or may not configure the mapping in the handover command. In one example, the second BS may or may not include the mapping configuration in the handover command.

The process 70 may correspond to the network in the process 40. Examples of the process 40 may be applied to the process 70, and are not repeated herein.

Figure 8:
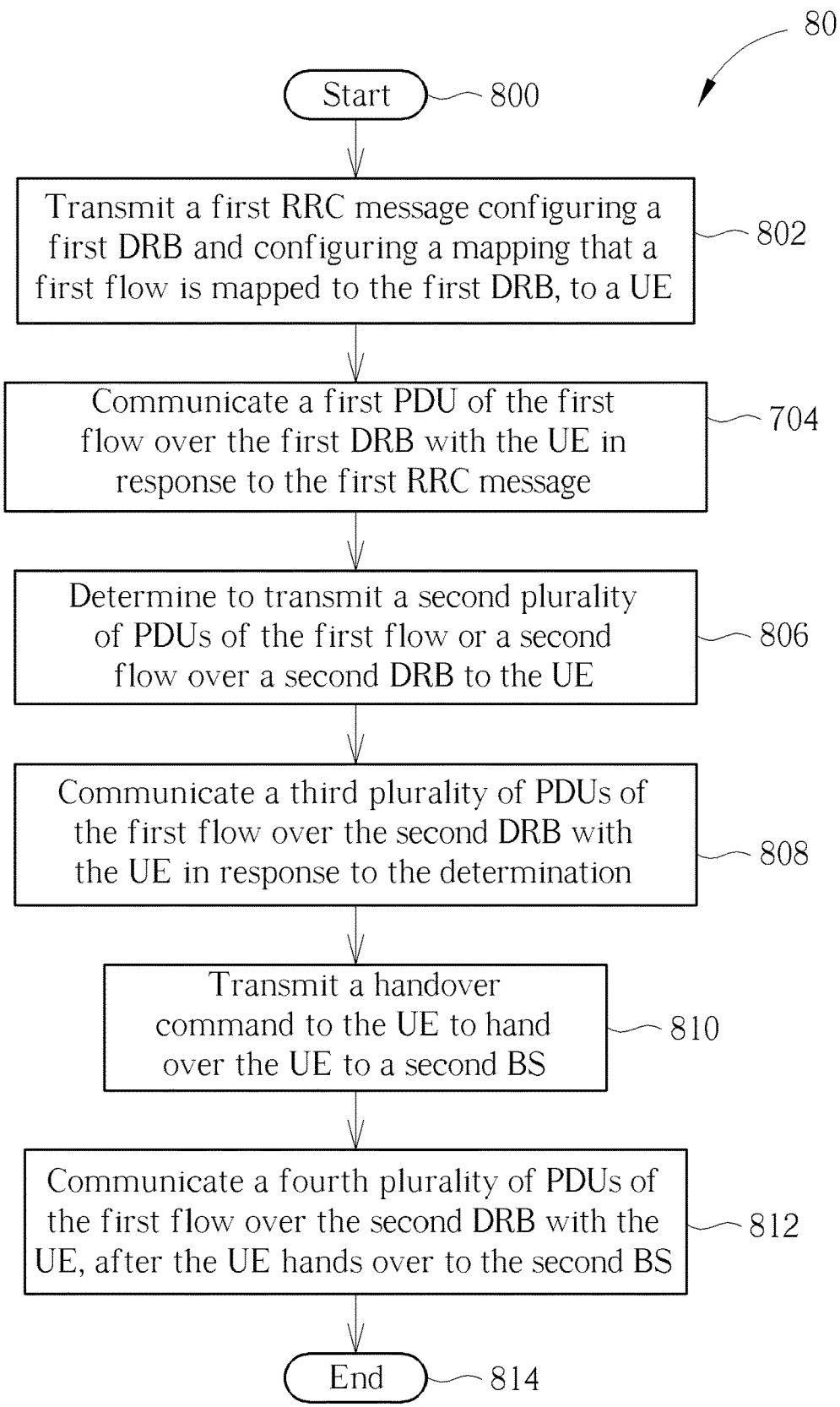
FIG. 8 is a flowchart of a process according to an example of the present invention.

FIG. 8 is a flowchart of a process 80 according to an example of the present invention. The process 80 may be utilized in the network in FIG. 1 which includes at least one of a first BS and a second BS, to configure a QoS to a UE. The process 80 includes the following steps:

Step 800: Start.

Step 802: Transmit a first RRC message configuring a first DRB and configuring a mapping that a first flow is mapped to the first DRB, to a UE.

Step 804: Communicate a first PDU of the first flow over the first DRB with the UE in response to the first RRC message.

Step 806: Determine to transmit a second plurality of PDUs of the first flow or a second flow over a second DRB to the UE.

Step 808: Communicate a third plurality of PDUs of the first flow over the second DRB with the UE in response to the determination.

Step 810: Transmit a handover command to the UE to hand over the UE to a second BS.

Step 812: Communicate a fourth plurality of PDUs of the first flow over the second DRB with the UE, after the UE hands over to the second BS.

Step 814: End.

According to the process 80, the network (e.g., the first BS) transmits a first RRC message configuring a first DRB and configuring a mapping that a first flow is mapped to the first DRB, to a UE. The network (e.g., the first BS) communicates (e.g., transmits or receives) a first PDU of the first flow over the first DRB with (e.g., to or from) the UE in response to the first RRC message. The network (e.g., the first BS) determines to transmit a second plurality of PDUs of the first flow or a second flow over a second DRB from the first BS. The network (e.g., the first BS) communicates a third plurality of PDUs of the first flow over the second DRB with the UE in response to the determination. Then, the network (e.g., the first BS) transmits a handover command to the UE to hand over the UE to a second BS (e.g., after awhile). The network (e.g., the second BS) communicates a fourth plurality of PDUs of the first flow over the second DRB with the UE, after the UE hands over to the second BS.

In one example, in a handover preparation, the first BS transmits the mapping (e.g., in a mapping configuration) and an indication indicating the determination or that the first flow is remapped to the second DRB, in a handover request message to the second BS. In one example, the first BS transmits an updated mapping configuration indicating that the first flow is mapped to the second DRB in a handover request message to the second BS. The second BS may transmit a handover request acknowledge message to the first BS in response to the handover request message. The handover request acknowledge message may include the handover command. When the first BS receives the handover request acknowledge message, the first BS transmits the handover command to the UE. The second BS communicates the fourth plurality of PDUs of the first flow over the second DRB with the UE according to the indication or the updated mapping configuration, after the UE hands over to the second BS.

The process 80 may correspond to the network in the process 50. Examples of the process 50 above may be applied to the process 80, and are not repeated herein.

Realization of the processes mentioned above is not limited to the above description. The following examples may be applied to the processes 30-80

In one example, when the first BS and second BS are the same BS, the handover is an intra-BS handover (e.g., the handover from a first cell of the BS to a second cell of the BS). In one example, when the first BS and second BS are different BSs, the handover is an inter-BS handover (e.g., the handover from a first cell of the first BS to a second cell of the second BS).

In one example, a PDU is a PDCP PDU. The PDCP PDU may include a flow identity (e.g., QoS flow identity) assigned by the network for the first flow (e.g., QoS flow or Internet Protocol (IP) flow) and include a PDCP service data unit (SDU). The flow identity may be in a mapping configuration. The PDCP PDU may include an IP packet. When the UE receives a PDCP PDU, the UE knows/determines that a PDCP SDU included in the PDCP PDU belongs to a flow according to the flow identity.

In one example, a PDCP configuration includes at least one of a sequence number size, a discard timer value and a RLC acknowledged or unacknowledged mode. A DRB configuration may include at least one of a DRB identity, an IP or QoS flow identity, a PDCP configuration and a RLC configuration.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program code 214.

To sum up, the present invention provides a method and a communication device for handling data transmissions after a handover. The communication device is configured a DRB and a mapping from a flow to the DRB according to a RRC message. Then, the communication device transmits a plurality of PDUs of the flow over the DRB (or another DRB) after performing the handover. Thus, the problem of the data transmissions after the handover is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling data transmissions after a handover, comprising:
   a storage device, for storing instructions of:
   receiving a first radio resource control (RRC) message configuring a first data radio bearer (DRB) and configuring a mapping that a first flow is mapped to the first DRB, from a first base station (BS), wherein the first RRC message includes a mapping configuration configuring the mapping and a DRB configuration configuring the first DRB;
   transmitting a first plurality of Protocol Data Units (PDUs) of the first flow over the first DRB in response to the first RRC message;
   receiving a second PDU of the first flow or a second flow over a second DRB from the first BS;
   transmitting a third plurality of PDUs of the first flow over the second DRB in response to the second PDU;
   receiving a handover command from the first BS;
   performing a handover to a second BS in response to the handover command; and
   transmitting a fourth plurality of PDUs of the first flow over the first DRB to the second BS in response to the handover command, after performing the handover to the second BS; and
   a processing circuit, coupled to the storage device, configured to execute the instructions stored in the storage device.

2. The communication device of claim 1, wherein the first RRC message configures the second DRB; or the communication device receives a second RRC message configuring the second DRB.

3. The communication device of claim 2, wherein the first flow and the second flow are configured by the first BS to be aggregated on the first DRB in the first RRC message or the second RRC message.

4. The communication device of claim 1, wherein the storage device further stores the instruction of:
   keeping the mapping configuration and the DRB configuration in response to the handover command.

5. The communication device of claim 1, wherein the storage device further stores the instruction of:

releasing a Secondary Cell (SCell) configuration or a Secondary Cell Group (SCG) configuration in response to the handover command.

6. The communication device of claim 1, wherein the communication device is configured with an identifier for monitoring a control channel transmitted by the network to schedule at least one of an uplink (UL) transmission and a downlink (DL) transmission, before performing the handover, and the storage device further stores the instruction of:
keeping the identifier in response to the handover command, if the handover command does not include a new identifier.

7. The communication device of claim 1, wherein the communication device transmits the fourth plurality of PDUs of the first flow over the first DRB after performing the handover in response to the handover command, when the handover command does not comprise a mapping configuration indicating the first flow to a DRB.

8. The communication device of claim 1, wherein the communication device transmits a fifth plurality of PDUs of the first flow over the second DRB after performing the handover in response to the handover command, when the handover command configures another mapping from the first flow to the second DRB.

9. A communication device for handling data transmissions after a handover, comprising:
a storage device, for storing instructions of:
receiving a first radio resource control (RRC) message configuring a first data radio bearer (DRB) and configuring a mapping that a first flow is mapped to the first DRB, from a first base station (BS), wherein the first RRC message includes a mapping configuration configuring the mapping and a DRB configuration configuring the first DRB;
transmitting a first plurality of Protocol Data Units (PDUs) of the first flow over the first DRB in response to the first RRC message;
receiving a second PDU of the first flow or a second flow over a second DRB from the first BS;
transmitting a third plurality of PDUs of the first flow over the second DRB in response to the second PDU;
receiving a handover command from the first BS;
performing a handover to a second BS in response to the handover command; and
transmitting a fourth plurality of PDUs of the first flow over the second DRB to the second BS in response to the handover command, after performing the handover to the second BS; and
a processing circuit, coupled to the storage device, configured to execute the instructions stored in the storage device.

10. The communication device of claim 9, wherein the first RRC message configures the second DRB; or the communication device receives a second RRC message configuring the second DRB.

11. The communication device of claim 10, wherein the first flow and the second flow are configured by the first BS to be aggregated on the first DRB in the first RRC message or a second RRC message.

12. The communication device of claim 9, wherein the storage device further stores the instruction of:
keeping the mapping configuration and the DRB configuration in response to the handover command.

13. The communication device of claim 9, wherein the storage device further stores the instruction of:
releasing a Secondary Cell (SCell) configuration or a Secondary Cell Group (SCG) configuration in response to the handover command.

14. The communication device of claim 9, wherein the communication device is configured with an identifier for monitoring a control channel transmitted by the network to schedule at least one of an uplink (UL) transmission and a downlink (DL) transmission, before performing the handover, and the storage device further stores the instruction of:
keeping the identifier in response to the handover command, if the handover command does not include a new identifier.

15. The communication device of claim 9, wherein the communication device transmits the fourth plurality of PDUs of the first flow over the second DRB after performing the handover in response to the handover command, when the handover command does not comprise a mapping configuration indicating the first flow to a DRB.

16. The communication device of claim 9, wherein the communication device transmits a fifth plurality of PDUs of the first flow over a third DRB after performing the handover in response to the handover command, when the handover command configures another mapping from the first flow to the third DRB.

17. A network comprising a first base station (BS) and a second BS for handling data transmissions, configured to perform the instructions of:
the first BS transmitting a first radio resource control (RRC) message configuring a first data radio bearer (DRB) and configuring a mapping that a first flow is mapped to the first DRB, to a communication device, wherein the first RRC message includes a mapping configuration configuring the mapping and a DRB configuration configuring the first DRB;
the first BS communicating a first Protocol Data Unit (PDU) of the first flow over the first DRB with the communication device in response to the first RRC message;
the first BS determining to transmit a second plurality of PDUs of the first flow or a second flow over a second DRB to the communication device;
the first BS communicating a third plurality of PDUs of the first flow over the second DRB with the communication device in response to the determination;
the first BS transmitting a handover command to the communication device to hand over the communication device to the second BS; and
the second BS communicating a fourth plurality of PDUs of the first flow over the first DRB with the communication device according to the mapping, after the communication device hands over to the second BS.

18. The network of claim 17, wherein the network is configured to perform the instructions of:
the first BS transmitting the mapping to the second BS in a handover request message in a handover preparation;
the second BS transmitting a handover request acknowledge message comprising the handover command to the first BS in response to the handover request message; and
the first BS transmitting the handover command to the communication device, when the first BS receives the handover request acknowledge message.

19. The network of claim 17, wherein the handover command does not configure the mapping.

20. The network of claim 17, wherein the handover command configures the mapping.

* * * * *